United States Patent [19]
Ricaud et al.

[11] Patent Number: 4,823,045
[45] Date of Patent: Apr. 18, 1989

[54] PICTURE TAKING TUBE HAVING A BIAS LIGHT DEVICE

[75] Inventors: Jean-Luc Ricaud, St. Martin-Le-Vinoux; Bernard Plos, St. Egreve, both of France

[73] Assignee: Thomson-CSF, Paris, France

[21] Appl. No.: 109,174

[22] Filed: Oct. 16, 1987

[30] Foreign Application Priority Data

Oct. 17, 1986 [FR] France ............................ 86 14414

[51] Int. Cl.[4] ........................ H01J 31/38; G02B 5/14

[52] U.S. Cl. .................................. 313/371; 313/384; 315/10; 350/96.1

[58] Field of Search ...................... 313/371, 372, 384; 315/10; 350/96.15, 96.23, 96.2, 96.1

[56] References Cited

U.S. PATENT DOCUMENTS 3,751,703 8/1973 Weijland et al. .................... 313/384
3,925,699 12/1975 Banks et al. ......................... 313/384
4,259,609 3/1981 Month et al. ........................ 313/372
4,465,927 8/1984 Scholz et al. ................ 250/213 VT

OTHER PUBLICATIONS

Patent Abstracts of Japan, vol. 2, No. 40, 16 Mar. 1978, p. 182 E78; & JP-A-53 4419 (Hitachi Seisakusho K.K.) 17-01-1978.

Patent Abstracts of Japan, vol. 2, No. 40, 16 Mar. 1978, p. 182 E78; & JP-A-53 4418 (Hitachi Seisakusho K.K.) 17-01-1978.

*Primary Examiner*—David K. Moore
*Assistant Examiner*—K. Wieder
*Attorney, Agent, or Firm*—Oblon, Fisher, Spivak, McClelland & Maier

[57] ABSTRACT

A picture taking tube is provided having a bias light device, said device being formed by a diffuser and a ring of light emitting diodes, which are placed about the glass vacuum enclosure of the tube, the light penetrating into the enclosure through gaps between the electrodes of the tube and also, if necessary, through small sized openings formed in these electrodes.

6 Claims, 3 Drawing Sheets

PICTURE TAKING TUBE HAVING A BIAS LIGHT DEVICE

BACKGROUND OF THE INVENTION

1. Field of the Invention

The present invention relates to a picture taking tube having a bias light device.

It is known that the remanence performances of picture taking tubes are improved if a degree of illumination constant in time and of a low level is superimposed on the useful illumination of the photosensitive target of the tube, that is to say a degree of illumination whose level is about a hundredth of that of the maximum light signal which the tube can record. This is currently called "bias light".

It will be recalled that remanence is the speed of response of the video signal to a modification of the illumination level. In the case of a tube with photosensitive target, of the photoconducting type, the remanence depends on many factors. We may however consider that it behaves like an RC electric circuit, in which R is the resistance of the electron beam which scans the target and C is the charge storage capacity of the target. The resistance R of the beam comes from the dispersion of energy $\Delta E$ between the electrons of the beam. In fact, the beam reaches the target at an average zero speed since the cathode is at zero potential. Thus, when the target is not illuminated, the beam brings the potential of its surface back to a slightly negative value $-\Delta E/2$. A small part of the beam is accepted by the target and the rest is sent back to the gun. The resistance R therefore increases progressively as the beam causes the potential of the target to be lowered towards $-\Delta E/2$.

The principle of bias light is to raise the potential of the target to a slightly positive value under the effect of an additional illumination.

Calculation and experience show that it is sufficient to raise the potential of the target to $+\Delta E/2$.

2. Description of the Prior Art

In the prior art three ways are known of providing bias light for picture taking tubes.

This bias light may be provided, not at the level of the picture taking tube and of the coil block which generally surrounds it, but at the level of the camera of which the tube forms part. The bias light device forms then part of the optics of the camera and the light reaches the front face of the photosensitive target of the tube, that is to say the face of the target turned outwardly of the tube.

This bias light ma also be achieved by acting on the picture taking tube. A part at least of the bias device is then internal to the tube. Thus, bias light devices are known in which an illumination source is used external to the tube and where glass tubes transmit the light to the inside of the tube as far as the photosensitive target. This is the case for example in the U.S. Pat. No. 3,751,703. Bias light devices are also known in which the illumination source is also internal to the tube and is formed, for example, by the filament of the cathode of the electron gun of the tube.

A last possibility is to provide the bias light at the level of the assembly formed by the coil block and mechanical covering which surround the tube and without acting on the tube itself. Thus, in the U.S. Pat. No. 4,031,551, the bias light is provided by illuminating the input glass face of the tube, laterally, that is to say in the direction of its thickness and perpendicularly to the longitudinal axis of the tube. This solution requires a coil block and a tube head (input face and adjacent parts) specially adapted for the available space is small.

SUMMARY OF THE INVENTION

The present invention relates to a picture taking tube having a bias light device which belongs to the last category mentioned, that is to say whose bias light is provided at the level of the coil block. Manufacture of the tube and of the camera is therefore absolutely not disturbed by positioning this focusing device. The invention does not require a special shape to be given to the vacuum enclosure of the tube, as is the case in the U.S. Pat. No. 4,465,927, nor incorporation in the tube of the diffuser, as is the case in the U.S. Pat. No. 3,925,699.

The bias light device of the invention has moreover the following advantages:

- it produces uniform illumination over the useful surface of the target;
- the space it takes up in the television camera is minimum;
- its power consumption is low;
- illumination of the target may be initiated and stopped sufficiently rapidly to be controlled image by image. This method of operating, image by image, is particularly interesting in certain medical applications where the picture taking tube is coupled to an X ray image intensifier,
- its construction is particularly simple and inexpensive.

The present invention relates to a picture taking tube having a bias light device, said tube including a photosensitive target and a vacuum enclosure essentially formed of glass, wherein said bias light device is formed by at least one ring of light emitting diodes positioned about the vacuum enclosure.

In a preferred embodiment of the invention, a diffuser is also positioned about the vacuum enclosure, the diffuser being closer to the photosensitive target than the ring of diodes.

BRIEF DESCRIPTION OF THE DRAWINGS

Other objects, features and results of the invention will be clear from the following description, given by way of non limitative example and illustrated by the accompanying Figures which show.

In the different Figures, the same references designate the same elements but, for the sake of clarity, the sizes and proportions of the different elements have not been respected.

DESCRIPTION OF THE PREFERRED EMBODIMENTS

Figure 1:
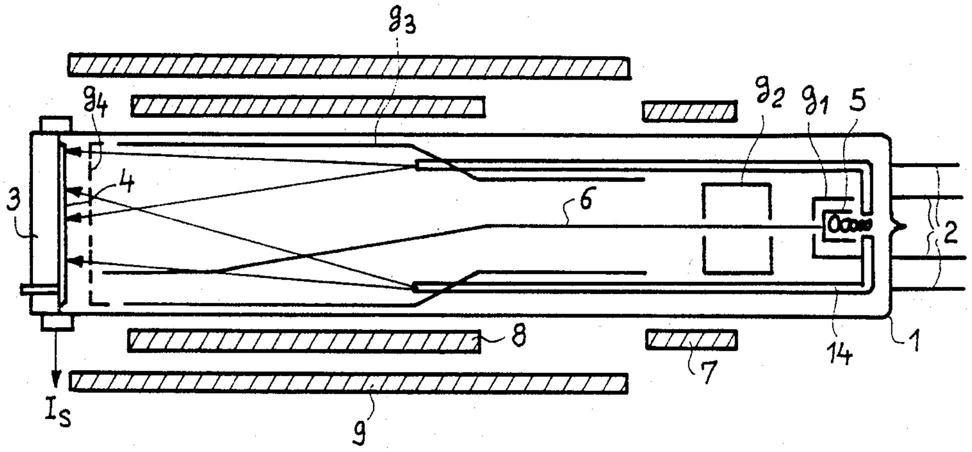
FIG 1 PRIOR ART
FIG. 1, a longitudinal sectional view of a picture taking tube, wit an electron gun of the FEMDEM type, having a bias light device of the prior art.

FIG. 1 shows in a longitudinal sectional view a picture taking tube with an electron gun; of the FEMDEM type (which means electro-magnetic focusing and electro-magnetic deviation). This is a question of an electron gun of the most widely used type. It is customary in this field to consider the picture taking tubes as formed of two parts: the electron gun and the photosensitive target. The electron gun designates then the electron gun properly speaking as well as the devices for focusing and deflecting the electron beam.

The picture taking tube shown in FIG. 1 includes a glass envelope 1, having connection pins 2 at one end and at the opposite end a glass input face 3 has a photosensitive target 4 on the face internal to the tube. The output signal IS from the tube is supplied through a connection connected to this target. The vacuum enclosure of this type of tube is generally almost entirely made from glass. This enclosure is symmetrical in revolution about the longitudinal axis of the tube. It is generally cylindrical. At the level of the connecting pins 2 there are often however a few ceramic pieces.

Inside the glass envelope 1 of the tube have been shown a cathode and its filament 5, the control grid $G_1$, the acceleration grid $G_2$, the wall electrode $G_3$ and the field grid $G_4$. One of the positions of the electron beam which scans the photosensitive target has also been shown with fine lines.

About the vacuum envelope of the tube there is an alignment coil 7, substantially at the level of the acceleration electrode $G_2$, then, at the level of the wall electrode $G_3$, there is a deflection coil 8 which is surrounded by a focusing coil 9.

The bias light device of the prior art which is shown here is internal to the picture taking tube. The source of illumination is formed by the filament of the cathode of the electron gun and glass tubes 14 transmit the light inside the tube as far as the photosensitive target.

Figure 2:
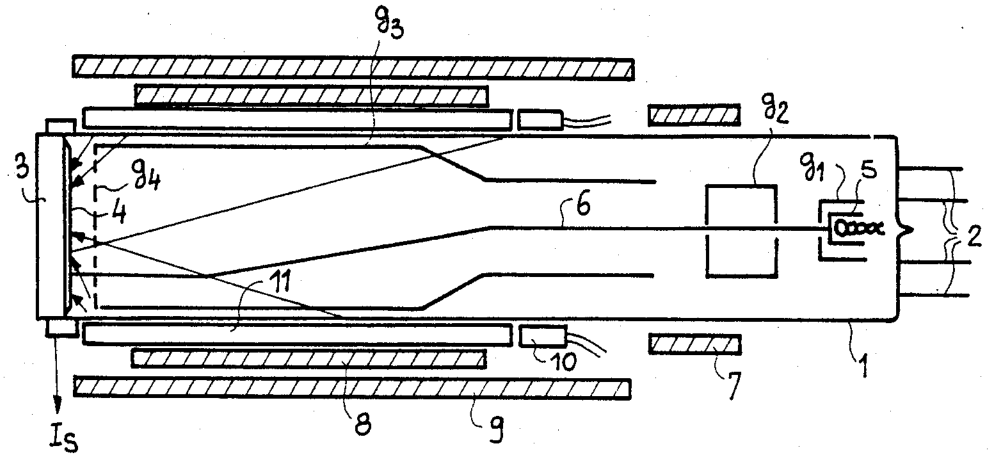
FIGS. 2 to 7, longitudinal sectional views of picture taking tubes, with different types of electron guns which are provided with bias light devices according to different embodiments of the invention.

FIG. 2 shows a longitudinal sectional view of a tube which only differs from that of FIG. 1 by its bias light device. In accordance with the invention, this bias light device is placed about the vacuum enclosure 1 of the tube, between this vacuum enclosure and the coil block.

This bias light device is formed by a ring of light emitting diodes 10 and a diffuser 11. The diffuser is closer to the photosensitive target than the ring of diodes.

The vacuum enclosure 1 of the tube is essentially formed of glass and lets the light from the ring of diodes pass. On the other hand, the electrodes of the tube are generally formed of a metal material, opaque to light. The invention uses the fact that there often exists between the electrodes gaps of a size sufficient for the light coming from the ring of diodes to penetrate into the space internal to the electrodes and strike the photosensitive target. The invention also provides, if required, for orifices 12, of small dimensions, in one or several grids or electrodes, to allow the light to pass without disturbing the operation of the tube.

Holes may for example be formed of 1 mm in diameter in electrode $G_3$ in the part where it is formed by a cylinder 21 mm in diameter. The holes formed is sufficiently small so as not to deform the equipotential surfaces in the part of the internal space of the tube used by the electron beam.

In the example shown in FIG. 2, the light from the ring of diodes 10 penetrates inside the vacuum enclosure 1 through the gap between the field grid $G_4$ and target 4, through the gap between the wall electrode $G_3$ and the field grid $G_4$ and through orifices 12 formed in the wall electrode $G_3$.

The wall electrode $G_3$ is of great length, for example 90 mm. Small size orifices may be readily formed in this equipotential surface, for example, slits disposed along the length of $G_3$, of a width of 1 mm and spaced apart evenly over the circumference of $G_3$, without disturbing the operation.

In FIG. 2 can be seen, shown with fine lines, the path of a few light beams coming from the diffuser or the ring of diodes and going directly to the target. The paths of light beams reflected or diffused before reaching the target have not been shown.

The light from the ring of diodes reaches the rear face of the photosensistive target 4 which is directed towards the electron gun of the tube, either directly or after reflection. The light reflection and diffusion properties of the parts of the gun can be advantageously improved.

To form a ring, the light emitting diodes are positioned, evenly, at the circumference of the enclosure of the tube and in the same plane perpendicular to the longitudinal axis of the tube. They are oriented so as to send the greatest part of the light that they emit into the diffuser.

The diffuser improves the uniformity of illumination reaching the target by distributing the light from the diodes in all directions. The diffuser also allows the ring of diodes to be moved away from the target so as not to introduce parasites in the electric signal from the target. It may for example be formed of PLEXIGLASS (registered trademark).

The use of light emitting diodes allows, if so desired, discontinuous operation of the biasing to be obtained. The biasing is then controlled image after image. This method of operation is interesting for certain medical operations in which the camera is coupled to an X ray image intensifying tube. An X ray pulse is sent when the camera is not operating. Then, the charges inscribed on the target are read when the camera and its biasing operate and thus several images are taken and the signals obtained processed.

Generally, when the integration sequence, which corresponds to acquisition of the light information on the target during one or more scanning frames, is dissociated from the beam reading frame, it is advantageous to use the bias light only during reading. In the opposite case, the bias light level inscribed on the target increases with the number of integration frames, which causes the level of the remanence to vary and results in a drift of the video signal level.

The light emitting diodes have as advantages the fact of requiring little space and of low consumption.

The use of a bias light device of the invention generally involves a slight increase of the internal radius of the deflection and focusing coils.

Thus, for example, in the case of the embodiment of the invention which is shown in FIG. 2, the tube has an external diameter of 25 mm and the coil block has an internal diameter of 33 mm, whereas it is usually 29 mm.

Experience has shown that the increase in the internal diameter of the coil block does no reduce the performances of the tube and may even increase them by allowing the head of the tube, bearing the references 3 and 4 in the Figures, to be concealed inside the focusing coil.

Figure 3:
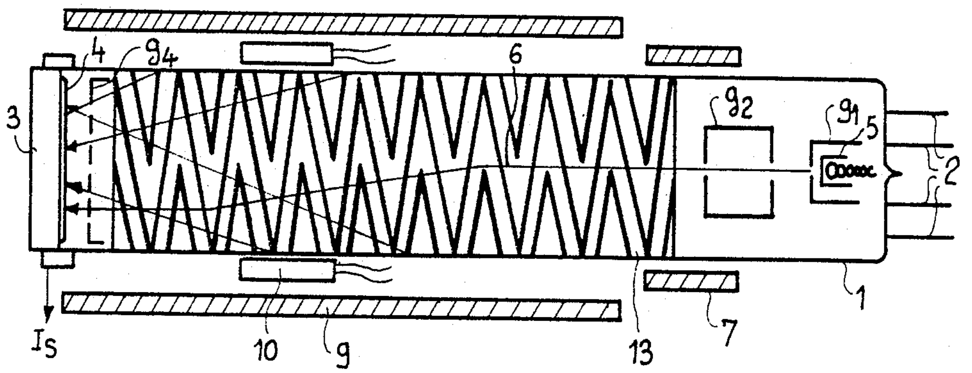

FIG. 3 shows one embodiment of the invention which differs from that of FIG. 2 for the picture taking tube used includes an electron gun of the FEMDES type (electro-magnetic focusing and electro-static deflection). FIG. 3 is a longitudinal sectional view of the tube and of the coils, only the deflector is seen in profile.

In FIG. 3 there is no deflection coil 8, as in FIG. 2, for the electrostatic deflection fields are produced by four electrodes 13 deposited on the internal wall of the vacuum enclosure of the tube. These electrodes 13 are formed by depositing a thin metal layer on the internal wall of the vacuum enclosure of the tube, then by etching isolating "zig-zag" lines which separate the deflection electrodes.

The light may penetrate inside the vacuum enclosure of the tube through these separation lines.

These four deflection electrodes 13 have supply voltages formed by the superimposition of sawteeth signals and an identical DC voltage for these four electrodes.

Thus, these electrodes 13 also play the role of the wall electrode $G_3$ of FIGS. 1 and 2.

In the embodiment shown in FIG. 3, the bias light device is formed solely by a ring of diodes 10. There is no diffuser. In this embodiment it is considered that the multiple deflections diffuse sufficiently the light emitted by the ring of diodes.

The light coming from the ring of diodes 10 penetrates into the tube through the space between the target and the field grid $G_4$, through the space between the four deflection electrodes 13 and the field grid $G_4$, and also through the isolating gaps left between the four deflection electrodes 13.

Figure 4:
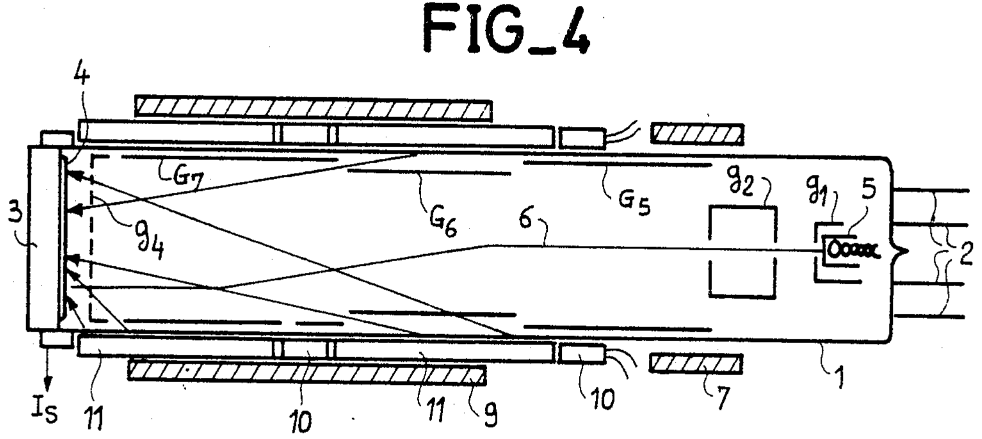

Another embodiment of the invention is shown in FIG. 4.

FIG. 4 is a sectional view of a picture taking tube with an electron gun of the FESDEM type (electrostatic focusing and electro-magnetic deviation).

Focusing is provided by three electrodes $G_5$, $G_6$ and $G_7$ which are either solid pieces of revolution as shown in FIG. 4, or deposited on the internal face of the vacuum enclosure of the tube, then etched. The coil block only comprises a deflection coil 9.

In FIG. 4, the bias light device is formed, starting from the photosensitive target, by a diffuser 11, a ring of light emitting diodes 10, then again a diffuser 11 and a ring of light emitting diodes 10.

The light from the bias light device may penetrate into the vacuum enclosure of the tube through the space between grid $G_4$ and target 4 and through the space between grids $G_4$ and $G_7$, $G_6$ and $G_7$ and $G_5$ and $G_6$.

The advantage of using several rings of light emitting diodes is that it is thus possible to increase the intensity of the illumination falling on the photosensitive target.

Furthermore, the use of several rings of diodes improves the uniformity of illuminating the target. In fact, the diodes are positioned so as to modify the angle of incidence of the light coming from each diode on the target so as to obtain the desired result.

The invention covers then the embodiments in which, around the vacuum enclosure of the tube, we find several assemblies formed by a diffuser and a ring of light emitting diodes, the diffuser being closer to the photosensitive diode than the ring of diodes.

In the embodiment shown in FIG. 2, as in that shown in FIG. 4, a diffuser may be disposed on the right of the ring of diodes, but the result obtained in so far as the illumination of the photosensitive target is concerned is not very advantageous for the light emitting diodes emit essentially towards their front face, and very little towards their connection lugs.

In so far as the diffuser is concerned, it is a piece of revolution, for example a cylinder, whose different parameters may be modified so as to improve the performances thereof.

Thus, to form the diffuser, a material is chosen diffusing in its mass but which does not absorb too much light. PLEXIGLASS may for example be used.

The surface state of the diffuser is important. Thus, some zones of the diffuser may be ground so as to increase the light diffusion.

Figure 5:
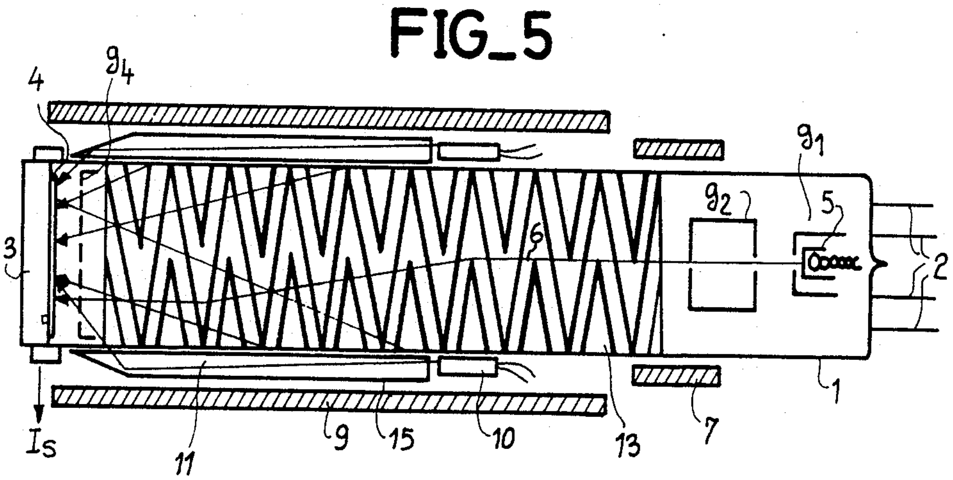

A mirror may also be formed on the external surface of the diffuser for the purpose of reflecting the light towards the inside of the tube and thus increasing the illumination. Such an embodiment has been shown in FIG. 5, where the external surface of the diffuser which carries a mirror 15 has been shown with a thick line. In FIG. 5, the end of the diffuser which is closest to the target is tapered.

Thus, the form of the diffuser is studied so as to improve the uniformity of illumination of the target for the light is partially reflected from the surface of the diffuser.

Figure 6:
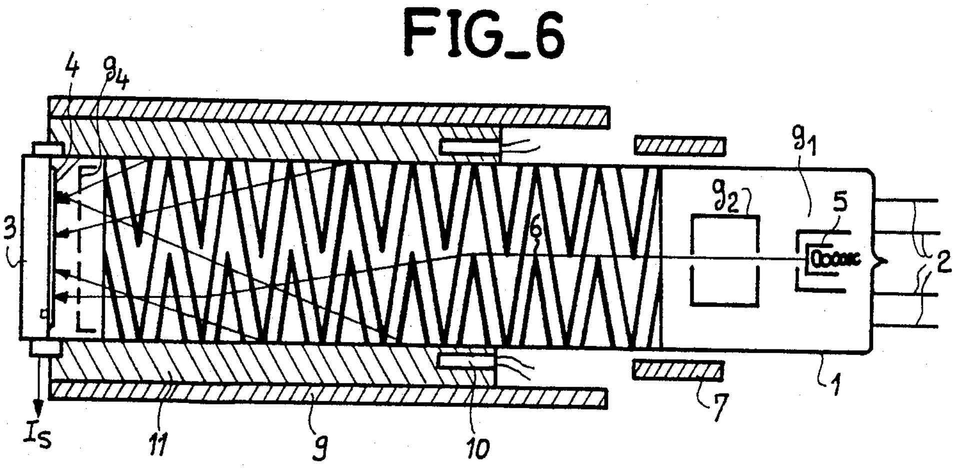

The term diffuser designates any part serving for diffusing and reflecting the light towards the inside of the tube and towards a target. In FIG. 6, an embodiment has been shown in which the diffuser is an initially liquid part, which fills the space between the enclosure of the tube and the coil block.

It is for example a transparent resin which polymerizes under the effect of the temperature and in which powder may be included for increasing its diffusion property. A powder is chosen of a material having an index greater than the index of the resin so that each grain reflects the light. Glass powder may for example be used.

Figure 7:
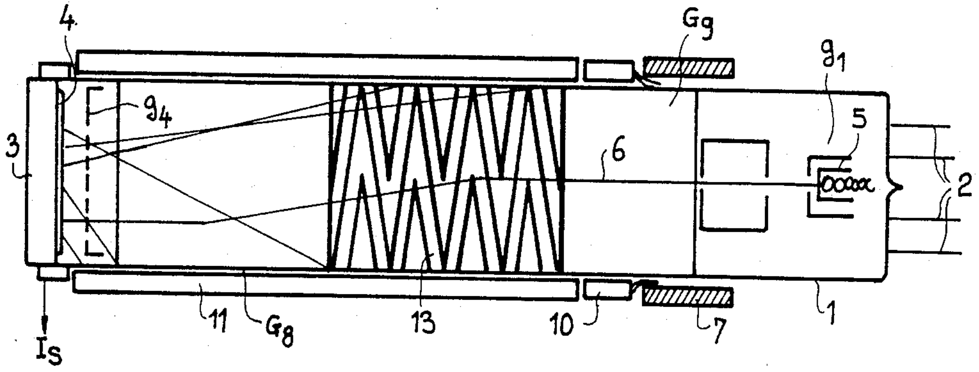

FIG. 7 shows a sectional view of a picture taking tube with an electron gun of the FESDES type, (electrostatic focusing and electro-static deviation).

As in the case of FIG. 3, the deflector is formed of electrodes 13, deposited on the internal face of the tube and separated by isolating lines.

The focuser is formed by the electrodes $G_8$ and $G_9$ which are shown seen in profile whereas the rest of the tube is seen in section.

The bias light device is formed, as in the case of FIG. 2, by a diffuser 11 followed by a ring of light emitting diodes 10.

The light from the diodes penetrates into the vacuum enclosure of the tube through the space between grid $G_4$ and target 4, through the space between grids $G_4$ and $G_8$, between the deflector 13 and grid $G_8$ and between the deflector and grid $G_9$. The light also penetrates into the tube through the gaps left between the four electrodes 13 of the deflector.

What is claimed:

1. A picture taking tube having a bias light device, said tube including a photosensitive target and a vacuum enclosure formed essentially of glass, said bias light device comprising:

at least one ring of light emitting diodes positioned about the vacuum enclosure; and at least one diffuser, positioned about the vacuum enclosure, the distance between said diffuser and said photosensitive target being less than the distance between said at least one ring of light diodes and said photosensitive target.

2. The tube as claimed in claim 1, wherein said bias light device includes, about the vacuum enclosure, several assemblies with each assembly being formed by one of said at least one diffuser and one of said at least one ring of light emitting diodes, each of said assemblies being such that the distance between its associated diffuser and the photosensitive target being less than the distance between its associated ring of diodes and said photosensitive target.

3. The tube as claimed in one of claims 1 or 2, wherein said tube includes at least one grid and at least one electrode of the tube so as to allow the light coming from the light emitting diodes to pass inside the vacuum enclosure.

4. The tube as claimed in claim 1, wherein the external surface of at least one of the diffusers includes a mirror.

5. The tube as claimed in claim 1, wherein the end of the one of said at least one diffuser which is closest to the target is tapered.

6. The tube as claimed in claim 1, wherein said at least one diffuser is formed of transparent resin, including powder which increases its diffusion property.

* * * * *